United States Patent
Schaefer et al.

(10) Patent No.: US 9,575,223 B2
(45) Date of Patent: Feb. 21, 2017

(54) MAGNESIUM MIRRORS AND METHODS OF MANUFACTURE THEREOF

(75) Inventors: John P. Schaefer, Plano, TX (US); Clay E. Towery, Plano, TX (US)

(73) Assignee: RAYTHEON COMPANY, Waltham, MA (US)

( * ) Notice: Subject to any disclaimer, the term of this patent is extended or adjusted under 35 U.S.C. 154(b) by 1235 days.

(21) Appl. No.: 13/189,739

(22) Filed: Jul. 25, 2011

(65) Prior Publication Data

US 2012/0287520 A1 Nov. 15, 2012
US 2015/0331158 A2 Nov. 19, 2015

Related U.S. Application Data

(60) Provisional application No. 61/485,939, filed on May 13, 2011.

(51) Int. Cl.
| | |
|---|---|
| G02B 5/08 | (2006.01) |
| B24B 13/00 | (2006.01) |
| B24B 1/00 | (2006.01) |

(52) U.S. Cl.
CPC ............ *G02B 5/085* (2013.01); *B24B 1/00* (2013.01); *B24B 13/0018* (2013.01); *G02B 5/08* (2013.01)

(58) Field of Classification Search
CPC ... G02B 5/0808; G02B 5/0858; G02B 5/0875; G02B 5/085; B24B 1/00; B24B 13/0018
USPC ................. 359/883, 900; 427/162; 451/28
See application file for complete search history.

(56) References Cited

U.S. PATENT DOCUMENTS

| | | | |
|---|---|---|---|
| 3,565,671 A * | 2/1971 | Teeg et al. | 428/332 |
| 3,947,302 A | 3/1976 | Grossman | |
| 4,515,828 A * | 5/1985 | Economy et al. | 427/129 |
| 4,592,622 A * | 6/1986 | Hashimoto et al. | 359/485.07 |
| 4,814,232 A | 3/1989 | Bluege et al. | |
| 4,865,451 A | 9/1989 | Ahonen et al. | |
| 5,122,423 A * | 6/1992 | Hase et al. | 428/846.7 |
| 5,717,532 A | 2/1998 | Chiba et al. | |
| 5,912,777 A * | 6/1999 | Jaworske | 359/883 |
| 5,933,278 A | 8/1999 | Plummer et al. | |
| 6,078,425 A | 6/2000 | Wolfe et al. | |

(Continued)

FOREIGN PATENT DOCUMENTS

| | | |
|---|---|---|
| DE | 10 2006 011973 B4 | 4/2011 |
| EP | 0456488 A1 | 11/1991 |

(Continued)

OTHER PUBLICATIONS

Sweeney, Michael et al., "Advanced Manufacturing Technologies for Reduced Cost and Weight in Portable, Ruggedized, VIS-IR, Multi-mode Optical Systems, for Land, Sea, and Air", Proceedings of SPIE, vol. 8012, Apr. 25, 2011.

(Continued)

*Primary Examiner* — Ricky D Shafer
(74) *Attorney, Agent, or Firm* — Lando & Anastasi, LLP

(57) ABSTRACT

Low density mirrors for optical assemblies and methods of manufacture thereof. In one example, a reflective mirror is formed of a magnesium or magnesium alloy substrate that is single point diamond turned to provide a reflective surface. The magnesium or magnesium alloy substrate is compatible with thin-film finishing processes and/or magnetorheological finishing which may be applied to improve a surface finish of the mirror.

11 Claims, 15 Drawing Sheets

(56) References Cited

U.S. PATENT DOCUMENTS

| | | | |
|---|---|---|---|
| 6,382,807 B1 | 5/2002 | Chandross et al. | |
| 6,398,372 B1 * | 6/2002 | Okada | 359/846 |
| 6,495,272 B1 | 12/2002 | Creber et al. | |
| 6,587,263 B1 | 7/2003 | Iacovangelo et al. | |
| 6,598,985 B2 | 7/2003 | Hagelin et al. | |
| 6,921,177 B2 | 7/2005 | Schaefer | |
| 7,344,263 B2 | 3/2008 | Ishizuka | |
| 8,535,604 B1 * | 9/2013 | Baker et al. | 419/38 |
| 2004/0165296 A1 | 8/2004 | Schaefer | |
| 2007/0039829 A1 * | 2/2007 | Pearson et al. | 205/177 |
| 2011/0097573 A1 * | 4/2011 | Okuda | B05D 5/06 428/336 |
| 2011/0102925 A1 | 5/2011 | Harris et al. | |

FOREIGN PATENT DOCUMENTS

| | | | |
|---|---|---|---|
| GB | 2364395 B | | 7/2004 |
| JP | 2002365583 | * | 12/2002 |
| JP | 2006-518883 A | | 8/2006 |
| JP | 2007-156264 A | | 6/2007 |
| JP | 2010-36172 | * | 2/2010 |
| JP | 2010-082746 A | | 4/2010 |
| WO | WO2006/000003 A1 | * | 1/2006 |

OTHER PUBLICATIONS

Kilbert, Robert et al., "Thixornolding Design Overview", Plastics & Molders & Manufacturers Association of SME, http://www.thixornat.com/docs/art_desover.pdf, Jan. 1. 2003.

* cited by examiner

MAGNESIUM MIRRORS AND METHODS OF MANUFACTURE THEREOF

CROSS-REFERENCE TO RELATED APPLICATIONS

This application claims priority under 35 U.S.C. §119(e) to U.S. Provisional Application No. 61/485,939 titled "MAGNESIUM MIRRORS AND METHODS OF MANUFACTURE THEREOF" and filed on May 13, 2011, which is herein incorporated by reference in its entirety.

BACKGROUND

High precision reflective mirrors are used in numerous optical devices and applications. One existing technique for making precision metal mirrors is to use a substrate of an aluminum alloy, such as that commonly known in the art as aluminum 6061-T6, and to carry out single point diamond turning (SPDT) of a surface on the substrate, which then serves as the reflective surface. Aluminum 6061-T6 is primarily aluminum, with alloy elements of zinc, chromium, iron, magnesium and silicon. The aluminum 6061-T6 alloy is lightweight, is easily machined by SPDT, and has good long-term stability. Accordingly, this alloy is commonly used to produce reflective mirrors for optical devices.

SUMMARY OF INVENTION

Aspects and embodiments are directed to low density reflective mirror fabrication processes that are compatible with surface finishing techniques to provide broadband optical performance in lightweight handheld devices. Various aspects and embodiments include reflective mirrors formed of magnesium or magnesium alloys, methods of manufacturing them, and optical devices using them.

According to one embodiment, a method of manufacture of a reflective mirror comprises providing a magnesium substrate having a first surface, and single point diamond turning the first surface of the magnesium substrate to produce a mirror surface.

In one example, the method further comprises thixotropically molding a magnesium alloy to produce the magnesium substrate. The act of thixotropically molding the magnesium alloy may include forming weight-reducing and/or stress-relieving features on a second surface of the substrate, the second surface being on a side of the substrate opposite the first surface. Thixotropically molding the magnesium alloy may include thixotropically molding magnesium AZ91-D, for example. In another example, the method further comprises casting one of magnesium and a magnesium alloy to produce the magnesium substrate. The method may further comprise finishing the first surface of the magnesium substrate after the single point diamond turning, the finishing including depositing a thin-film finish layer on the mirror surface, and polishing the thin-film finish layer to provide a polished surface. In one example, the finishing further includes depositing a thin reflective layer on the polished surface to produce a reflective surface of the mirror. In another example, the method further comprises finishing the mirror surface of the magnesium substrate using a computer controlled polishing process, such as magnetorheological finishing for example. Single point diamond turning the first surface of the magnesium substrate may include using a free-form single point diamond turning process.

According to another embodiment, an optical apparatus comprises a mirror including a magnesium substrate having a first surface that provides a reflective mirror surface for the mirror, wherein the magnesium substrate is thixotropically molded magnesium AZ91-D.

In one example, the magnesium substrate has a second surface on a side of the magnesium substrate opposite the first surface, the second surface being configured with weight-reducing and/or stress-relieving features. In another example, the mirror further includes a thin-film finish layer deposited over a first surface of the magnesium substrate, the thin-film finish layer having on a side thereof opposite to the magnesium substrate a second surface that is polished to improve a surface finish thereof, and a reflective layer disposed over the second surface of the thin-film finish layer, the reflective layer forming the reflective mirror surface of the mirror. In one example, the surface finish of the thin-film finish layer is less than approximately 20 Angstroms RMS.

According to another embodiment, a method of manufacture of a reflective mirror comprises providing a magnesium substrate formed of one of magnesium and a magnesium alloy, the magnesium substrate having a first surface, and single point diamond turning the first surface to produce the reflective mirror.

Providing the magnesium substrate may include, for example, casting magnesium to produce the magnesium substrate or thixotropically molding a magnesium alloy (e.g., magnesium AZ91-D) to produce the magnesium substrate. In one example, the method further comprises depositing a thin-film finish layer on the first surface of the substrate, and polishing the thin-film finish layer to provide a polished surface. The method may further comprise depositing a thin reflective layer on the polished surface to produce a reflective surface of the mirror. In one example, the method further comprises plating the first surface prior to single point diamond turning the first surface. In another example, the method further comprises finishing the first surface using a computer controlled polishing process, such as magnetorheological finishing, for example.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
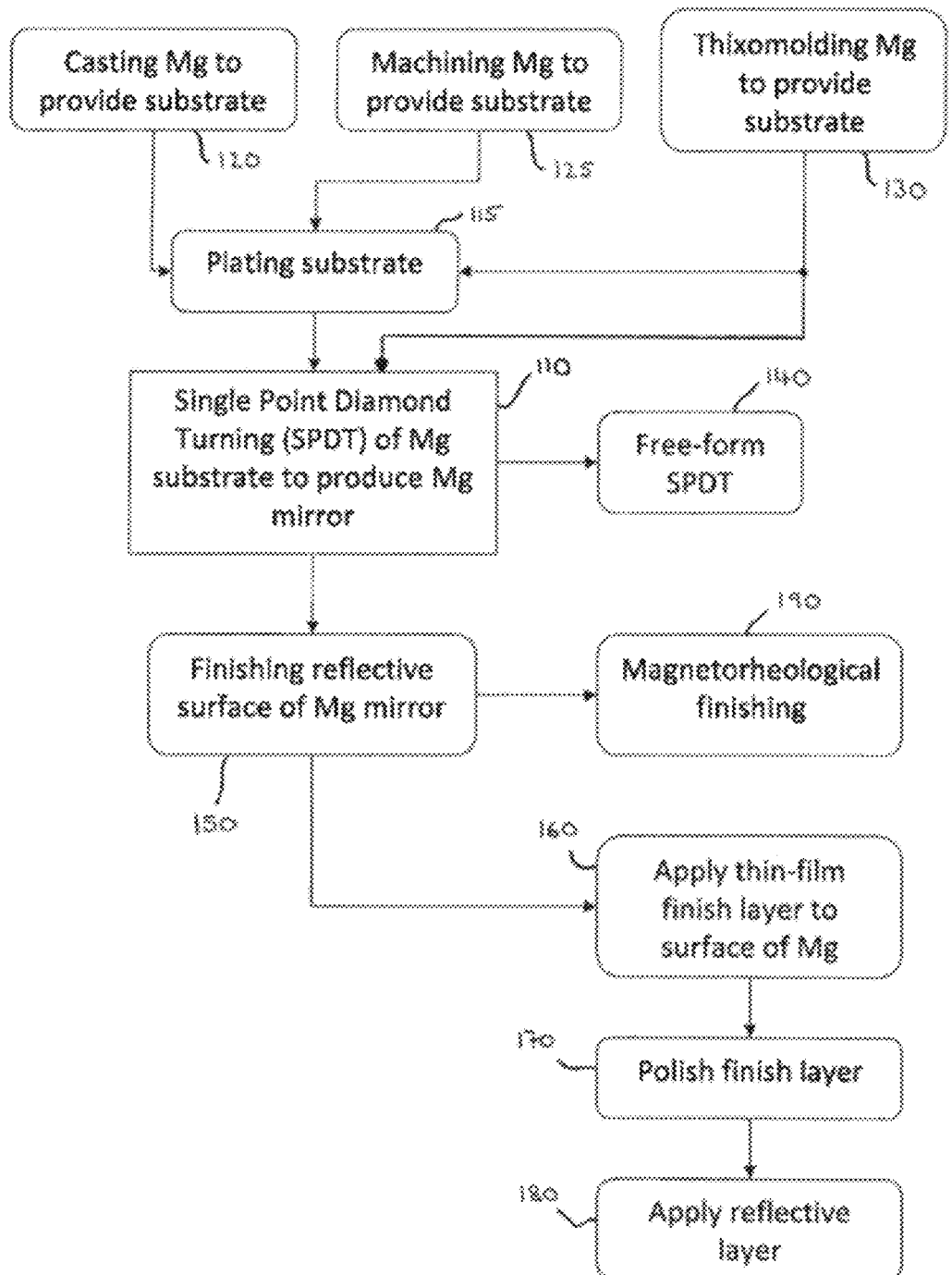
FIG. 1 is a flow diagram illustrating one example of a manufacturing process for a reflective mirror according to aspects of the invention.

Modern precision optical devices are configured to perform a variety of different functions, including multi-wavelength imaging (e.g., visible and infrared imaging) as well as laser ranging, targeting and/or designation. Recently, there has been increased interest in developing person-portable (e.g., handheld) multi-function, multi-wavelength optical devices. In order for these devices to both perform as intended/desired and to be easily person-portable, they should be able to maintain optical alignment (also referred to as "boresight") over a range of temperatures, be lightweight (e.g., weigh only a few pounds), and be affordable in volume. Conventional multi-aperture refractive optical assemblies have been unable to affordably and reliably meet these goals. The use of reflective mirrors in the optical assemblies resolves the concern of maintaining boresight over temperature; however, in the context of high-volume person-portable, precision optical devices, conventional aluminum alloy mirrors have several disadvantages, including weight and cost.

Accordingly, aspects and embodiments are directed to reflective mirrors that are formed by carrying out a single point diamond turning (SPDT) process on a low density substrate, such as magnesium or a magnesium alloy for example, rather than an aluminum alloy substrate. Magnesium is approximately 35% less dense than aluminum 6061-T6 which is commonly used to form precision reflective mirrors. In addition, embodiments of magnesium mirrors may include engineered structural features that further reduce the weight of the mirror, as discussed further below. Accordingly, the use of magnesium mirrors may provide a significant weight advantage for person-portable devices. Magnesium mirrors may also offer significant cost advantages over aluminum mirrors, as discussed further below. Examples discussed herein demonstrate that mirror substrates formed of cast or molded magnesium or magnesium alloys can be manufactured using SPDT to achieve broadband optical surface quality. In addition, magnesium mirrors are demonstrated to be compatible with surface finishing techniques to improve the surface finish to beyond present SPDT capabilities, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Where the term "magnesium" is used as an adjective herein, it is intended to cover both pure magnesium and magnesium alloys. Magnesium alloys are those compounds having magnesium as the primary or majority component.

Referring to FIG. 1 there is illustrated a flow diagram of one example of a method of manufacturing a magnesium mirror according to one embodiment. Embodiments and examples of the manufacturing process are discussed below with continuing reference to FIG. 1.

Figure 2:
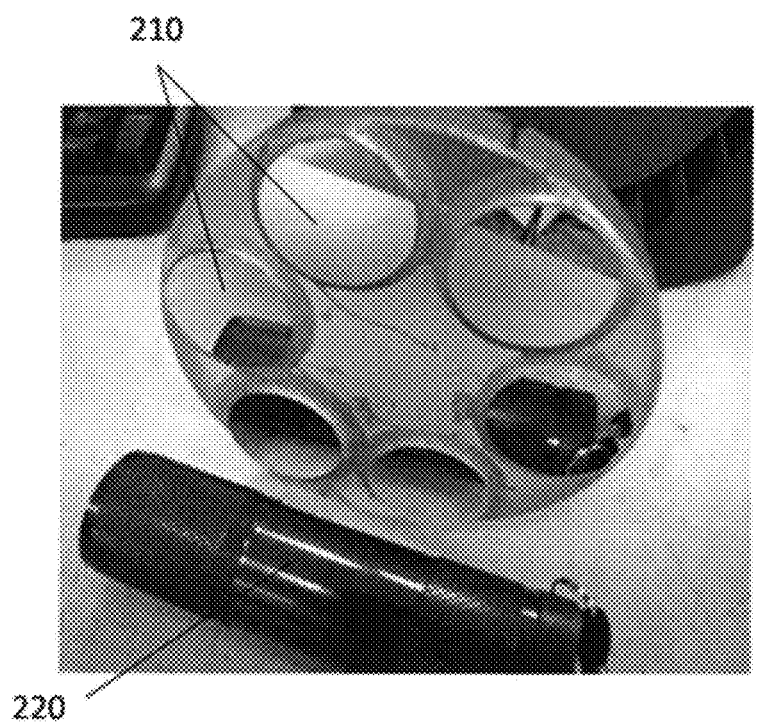
FIG. 2 is an image of a plurality of magnesium samples that have been diamond point turned on a lathe according to aspects of the invention.

According to one embodiment, a mirror is formed from a magnesium substrate having a surface which is machined and optionally further processed to provide the reflective surface of the mirror. In one embodiment, the surface of the substrate is machined using precision technique known as SPDT step 110). As known to those skilled in the art, SPDT is a process of mechanical machining of precision elements using lathes equipped with natural or synthetic diamond-tipped single-point cutting tools. The process of diamond turning is widely used to manufacture high-quality aspheric optical elements from metals (such as aluminum 6061-T6), plastics, and other materials. It has now been demonstrated, as disclosed herein, that magnesium and magnesium alloys may be diamond point turned to achieve an optical quality surface. FIG. 2 illustrates an image of several different magnesium samples 210 that were diamond point turned on a lathe. The article 220 is present in the image as a reference to demonstrate reflection by the reflective surfaces of the magnesium mirror samples 210.

The surface finish quality (smoothness) of the reflective surface of the mirror is measured as the averaged (RMS) peak-to-valley (PV) of the microscopic features left by the SPDT tool. Surface finish is generally measured using a three-dimensional (3D) white light scanning interferometer. Diamond point turning of aluminum 6061-T6 can typically achieve a surface finish of approximately 80 Å RMS, with the surface finish quality being limited by defects or artifacts left after SPDT by alloy elements such as zinc, chromium and iron. Examples discussed below demonstrate that SPDT of magnesium substrates can achieve a surface finish as good as or better than aluminum 6061-T6 using the same or similar manufacturing processes.

Referring again to FIG. 1, in one embodiment, the SPDT process 110 includes using a free-form SPDT process (step 140) to achieve manufacturing of off-axis mirrors in a surface-normal, or on-axis, position, thereby eliminating excess mirror bulk weight. An off-axis optical device is one in which the optical axis of the aperture is not coincident with the mechanical center of the aperture, and the optical surface is therefore rotationally non-symmetric. SPDT of rotationally non-symmetric surfaces may be achieved using a slow tool servo device. In such a device, the diamond turning lathe includes two linear axes (x- and z-axes) and a spindle or rotary axis (c-axis). The diamond tool is mounted along the z-axis of the lathe, and the optical device with the rotationally non-symmetric surface is mounted on the c-axis. The optical equation that defines the optical surface to be machined is used to create a tool path that controls movement of the diamond tool across the work surface of the optical device. The tool path is encoded as a computer-readable file, and the SPDT machine is controlled by the computer to execute the tool path to produce the rotationally non-symmetric optical surface. Conventionally, off-axis mirrors are designed to overcome deformations caused by centrifugal forces. By using free-form SPDT, centrifugal forces are greatly reduced and accordingly, the mirror design may be optimized to minimize weight, for example by incorporating engineered structural features as discussed below.

The magnesium substrate upon which the SPDT process is to be performed may be produced, for example, by casting magnesium or a magnesium alloy (step 120), machining magnesium or a magnesium alloy (step 125), or by thixotropically molding a magnesium alloy (step 130). Other methods by which the magnesium (or magnesium alloy) substrate may be produced include forging, stamping and hot-pressing. The magnesium substrate may be plated (step 115), for example, electro-plated with magnesium, copper plated, or nickel plated using an electroless process.

Cast magnesium substrates exhibit some porosity which limits the surface finish achievable with SPDT. However, as discussed below, according to one embodiment magnesium substrates have been demonstrated to be compatible with certain surface finishing processes which can improve the surface finish of the magnesium substrate to optical quality for many applications. Thixotropic fluids shear when the material flows, but thicken when standing. For magnesium alloys, thixotropic molding uses a machine similar to injection molding. In one example of a single step thixomolding process, room temperature magnesium alloy chips (with a chip size of approximately 4 mm) are fed into a heated barrel (maintained under an argon atmosphere to prevent oxidation of the magnesium chips), where they are heated into a semi-solid state and shearing force is applied to generate a globular slurry. The slurry may then be injected into a die for molding, similar injection molding of plastics.

Magnesium alloys have been found to be well suited to thixotropic molding for mirror substrates. Some examples of suitable magnesium alloys for mirror substrates include magnesium AZ91-D and AM60B. Magnesium AZ91-D is a high-purity alloy comprising approximately 90% magnesium, 9% aluminum, and trace amounts of zinc, silicon and iron (less than 0.005% iron). Magnesium AZ91-D has excellent corrosion resistance and is widely available and relatively inexpensive. Table 1 below contains example physical properties of magnesium AZ91-D.

TABLE 1

| | |
|---|---|
| Density | 1830 kg/m$^3$ (at 20° C.) |
| Solidus temperature | 470° C. |
| Liquidus temperature | 595° C. |
| Kinematic viscosity | $1.0 \times 10^{-6}$ m$^2$/s (at 590° C.) |
| Specific heat | 1014 J/kgK (at 20° C.) |
| Thermal conductivity | 72 W/mK (at 20° C.) |
| Latent heat | $3.73 \times 10^5$ J/kg |

According to one embodiment, magnesium AZ91-D is well suited to thixomolding for mirror substrates due to its ability to become amorphous, resulting in well-refined grain structure that leads to the excellent surface finish quality achievable with the alloy, as demonstrated in the examples discussed below. In addition, since during thixomolding the alloy is mixed under high temperature and pressure (for example, temperatures of approximately 560-630 degrees Celsius and an injection pressure of approximately 500-1200 kgf/cm2), the resulting substrate is very stable and dense, and lacks the porosity present in cast magnesium substrates. This also contributes to the ability to obtain surface finishes of less than 80 Å RMS with thixotropically molded magnesium substrates. Furthermore, thixomolding is a well-developed, inexpensive process, allowing the magnesium substrates to be produced far more cost effectively (particularly in volume) than comparable aluminum 6061-T6 substrates. For example, the cost of a thixotropically molded magnesium mirror substrate may be more than an order of magnitude less than a comparable aluminum 6061-T6 mirror substrate.

It has further been found, as disclosed herein, that wear on the diamond cutting tool is significantly reduced for magnesium substrates, including substrates formed of thixotropically molded magnesium AZ91-D alloy, compared with the tool wear from processing substrates formed of the aluminum 6061-T6 alloy. As discussed further below, SPDT was performed on 15 thixotropically molded magnesium substrates, after which there was found to be no measurable tool variation. By contrast, tool variation typically would be measurable after processing 15 aluminum 6061-T6 substrates, and the tool cutting path would need to be modified to account for the tool variation. Tool wear is a significant cost factor, particularly for high-volume devices. A significant factor contributing to tool wear from aluminum 6061-T6 alloy substrates is the presence of substantial amounts of iron in the alloy which reacts with the diamond tip of the cutting tool, causing chemical wear. By contrast, several magnesium alloys, including magnesium AZ91-D and other magnesium AZ91 alloys, contain only a trace amount of iron (no more than 0.005% for magnesium AZ91-D and magnesium AZ91-E, another high-purity alloy with excellent corrosion resistance) or even no iron at all, and therefore chemical wear on the diamond tip is greatly reduced. In addition, magnesium alloys such as the AZ91 series of alloys are softer, more ductile and less dense (approximately 35%) than the aluminum 6061-T6 alloy, resulting in decreased mechanical wear on the cutting tool. Although purer aluminum alloys (containing less iron) are available, aluminum 6061-T6 has been demonstrated to be very stable over temperature and time, and is therefore presently the most popular alloy used for precision optical mirrors. Thus, the reduced tool wear of magnesium alloys relative to aluminum 6061-T6 is a significant advantage. Reduced tool wear may result in reduced set-up time and/or labor costs associated with monitoring and/or modifying the tool during the fabrication process, as well as reduced cost per device for tool replacement.

Figure 3A:
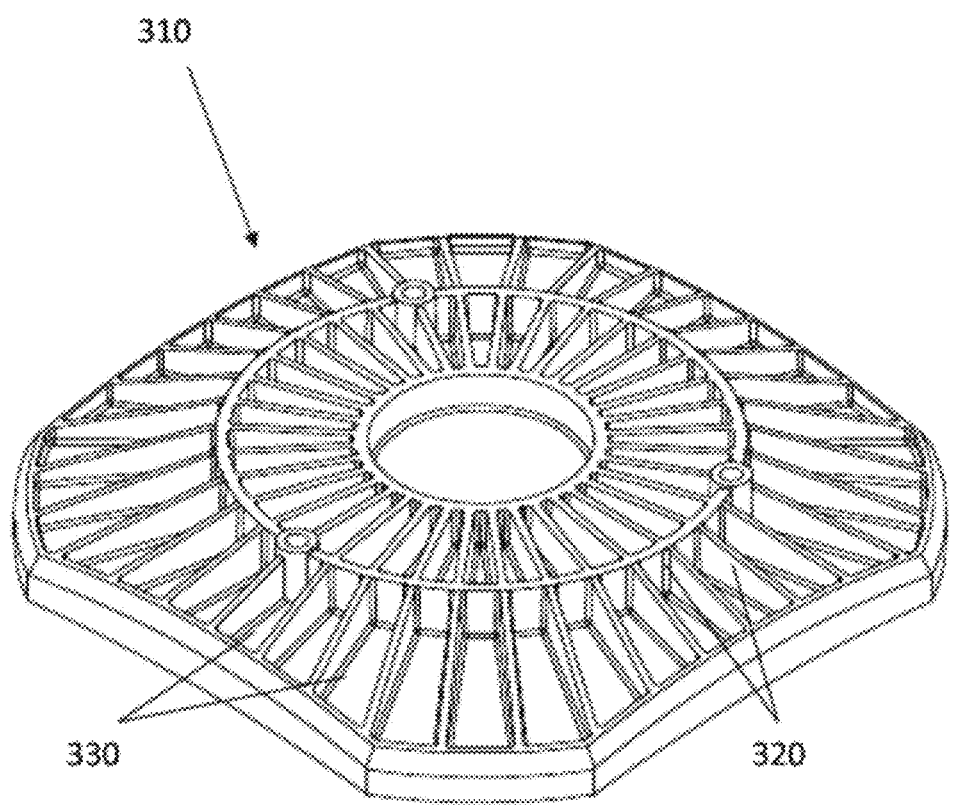
FIG. 3A is a diagram of one example of a thixotropically molded mirror substrate incorporating engineered structural features on the non-reflective surface according to aspects of the invention.
Figure 3B:
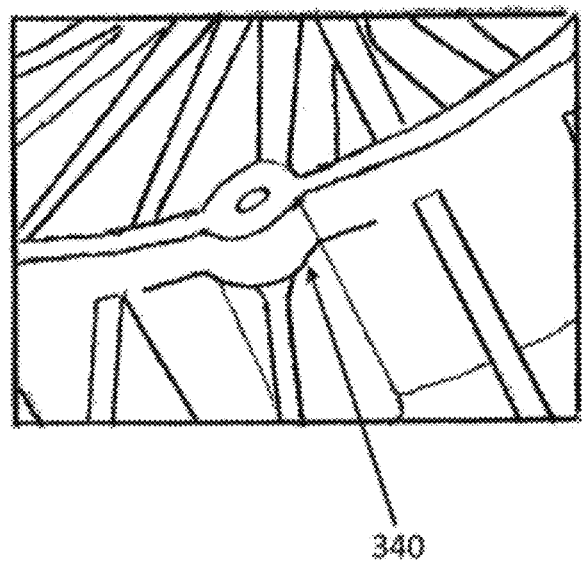
FIG. 3B is a diagram of a portion of FIG. 3A illustrating an additional structural feature according to aspects of the invention.

A further advantage of using a thixotropically molded magnesium alloy is that the die used in the molding process may be configured to impart any of numerous shapes and features to the magnesium substrate. For example, referring to FIG. 3A there is illustrated an example of the back side (i.e., the non-reflective surface) of a magnesium mirror 310 which incorporates engineered structural features, such as support struts 320 and grooves or recesses 330. The back side of the mirror 310 may be designed with a multitude of thin support webs to provide the mirror with high stiffness and low weight without additional machining costs because these features may be easily thixotropically molded. In addition, the mirror 310 may incorporate features to improve manufacturing reliability. For example, FIG. 3B illustrates a portion of the mirror 310 including isolation cuts 340 to decrease SPDT mounting stress in the mirror substrate. Mounting features may also be incorporated into the mirror structure. These and other features may be easily and inexpensively molded into the magnesium substrate during the thixomolding process. By contrast, at present machining such features into an aluminum mirror is difficult and/or prohibitively expensive. In one example, a mirror 310 including the illustrated structural features formed of thixotropically molded magnesium AZ91-D and having a 3 inch by 3 inch (75 mm by 75 mm) aperture has a weight of approximately 1.47 ounces (42 grams). Thus, due to the lower density of magnesium relative to aluminum and the ability to include weight-decreasing features, embodiments of the magnesium mirrors may be three to four times lighter than comparable mirrors formed of aluminum 6061-T6, while also being more affordable to produce in volume and having excellent optical properties such as surface finish quality. Lighter mirrors not only reduce the weight of the optical assemblies in which they are used directly, but also allow for lighter gimbals, torquers, angle resolvers and other devices that move the optical assemblies, which may significantly reduce the overall weight of systems.

An important consideration for mirrors used in precision optical devices is optical stability over time and temperature. As discussed below, experimental data has been obtained demonstrating that magnesium mirrors can become optically stable over time with proper thermal conditioning, and also that surface finishes equal to or better than those achievable with SPDT aluminum alloys can be obtained. These results are unexpected given that Magnesium is typically considered to be optically unstable. The commonly-used aluminum 6061-T6 alloy contains magnesium as an alloy element. This magnesium alloy element in aluminum 6061-T6 frequently causes defects in the surface of aluminum 6061-T6 mirrors due to oxidation and other reactions, particularly if the mirror substrate is exposed to a humid environment. This known concern regarding the presence of magnesium in the aluminum 6061-T6 alloy, together with the known highly reactive nature of magnesium, suggests that attempts to form optical components from magnesium would be unsuccessful due to an expectation that the optic would not be stable and that acceptable surface finish quality would not be achievable.

As discussed above, according to certain embodiments, magnesium mirrors formed using SPDT are compatible with surface finishing techniques to improve the surface smoothness (step 150). The examples presented below demonstrate that magnesium substrates can be produced using SPDT to have a surface finish quality of at least between approximately 58 Å RMS and 80 Å RMS. Finishes of this quality provide adequately low scatter for many applications, particularly those in which the reflected radiation of interest has a relatively long wavelength, for example, greater than approximately 3 microns. For shorter wavelengths, for example applications using visible light, the surface finish may need to be improved in order to achieve sufficiently low scatter. In addition as discussed above, some cast magnesium substrates may not have sufficiently good surface finish after SPDT, at least for some applications, and therefore it may be desirable to improve the surface finish. Accordingly, in some embodiments a finishing process (step 150) may be applied after SPDT to improve the surface finish of the mirror.

One process for producing an aluminum mirror having a surface finish quality that is improved over the 80-90 Å RMS typically achievable with SPDT is described in U.S. Pat. No. 6,921,177, which is herein incorporated by reference in its entirety. This process includes forming a thin-film finish layer over the surface of the mirror substrate using thin-film techniques and polishing the surface of the finish layer. A thin reflective layer is then formed on the polished surface of the finish layer. Optionally, a thin overcoat may be applied over the reflective layer to protect the reflective layer and/or increase the reflectance within a selected waveband.

Figure 4:
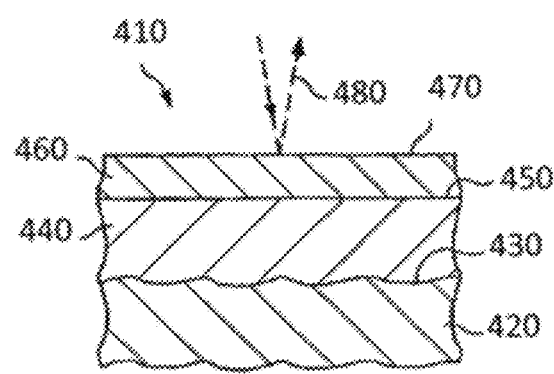
FIG. 4 is a diagrammatic fragmentary sectional view of one example of a high precision magnesium mirror according to aspects of the invention.

In certain examples, embodiments of the finishing process described in U.S. Pat. No. 6,921,177 are applied to the diamond turned magnesium mirror to improve the surface finish. Referring to FIG. 4 there is illustrated a diagrammatic fragmentary sectional view of one example of a high precision magnesium mirror 410. The mirror 410 includes a substrate 420 formed of cast or thixotropically molded magnesium or magnesium alloy (for example, magnesium AZ91-D) as discussed above. The substrate 420 has a surface 430 that is processed using SPDT as discussed above. After the SPDT process (step 110) is complete, a finish layer 440 is deposited on the surface 430 (step 160) using thin-film vapor deposition, for example. As discussed in U.S. Pat. No. 6,921,177, the finish layer 440 may comprise any suitable material that can be polished, including for example, a nickel-chromium alloy or amorphous silicon. The finish layer 440 may have a thickness of approximately 5000 Å. Since the finish layer 440 is thin, its upper surface 450 will initially conform at least to some degree to the SPDT surface 430. Accordingly, in step 170, the surface 450 is polished. A thin reflective layer 460 is then formed on the polished surface 450 (step 180) using thin-film vapor deposition techniques, for example. As discussed in U.S. Pat. No. 6,921,177, the thin reflective layer may comprise any suitable reflective material, for example, silver, gold or aluminum. The reflective layer may have a thickness of approximately 2000 to 5000 Å. The reflective layer 460 provides a high precision reflective surface 470 which can reflect radiation 480. Since the reflective layer 460 is a thin film layer, its surface will conform, at least substantially, to the polished surface 450.

According to another embodiment, the surface figure of a magnesium mirror may be improved beyond present diamond point turning capabilities by applying magnetorheological finishing (step 190) to the mirror surface after the SPDT process. In other examples, computer controlled polishing (CCP), such as magnetorheological finishing for example, may be applied directly to a bare or plated magnesium substrate (following step 115 in FIG. 1). Magnetorheological finishing (MRF) is a computer-controlled precision surface finishing process. As discussed above, the surface finish of the mirror after the SPDT process may be measured interferometrically. MRF uses the interferometer data to characterize a removal map of the optical surface that allows the surface to be selectively machined to reduce peak-to-valley variation. The MRF process uses an interferometrically controlled magnetorheological (MR) finishing slurry (a suspension of micrometer-sized magnetic particles composed of carbonyl iron in a carrier field) as a polishing tool. A thin ribbon of the MR slurry is drawn onto a rotating wheel. An electromagnet below the wheel causes the MR slurry to stiffen in milliseconds. The MR slurry returns to its original viscosity as it leaves the electromagnetic field of the electromagnet. Shear stress caused by pressing the optical surface against the MR slurry creates polishing pressure over the optical surface. A computer-controlled algorithm generates the interferometrically characterized removal map and calculates the dwell time and position of the MR slurry to accomplish deterministic removal of selected portions of the substrate surface to polish the surface and "smooth" the surface figure of the finished substrate. MRF or other CCP methods may be applied to the magnesium substrate alone or in combination with the thin-film finishing process discussed above.

EXAMPLES

The function and advantages of these and other embodiments will be more fully understood from the following examples. The examples are intended to be illustrative in nature and are not to be considered as limiting the scope of the systems and methods discussed herein. In each example discussed below, SPDT was carried out on spherical magnesium substrates using a using a Precision 350 SPDT lathe produced by Precitech (of Keene, N.H.). Several mirrors were diamond point turned, thermal conditioned (as discussed in Example 1 below), and finished. Data and test results for these mirrors are provided in the examples below. The images of the processed substrates discussed below were taken using an interferometer produced by Zygo Corporation (Middlefield, Conn.). The mirror surfaces were of a spherical shape to facilitate interferometric testing, and to minimize measurement errors that could skew the results of the long term stability testing discussed in Example 1 below.

Example 1

Figure 5:
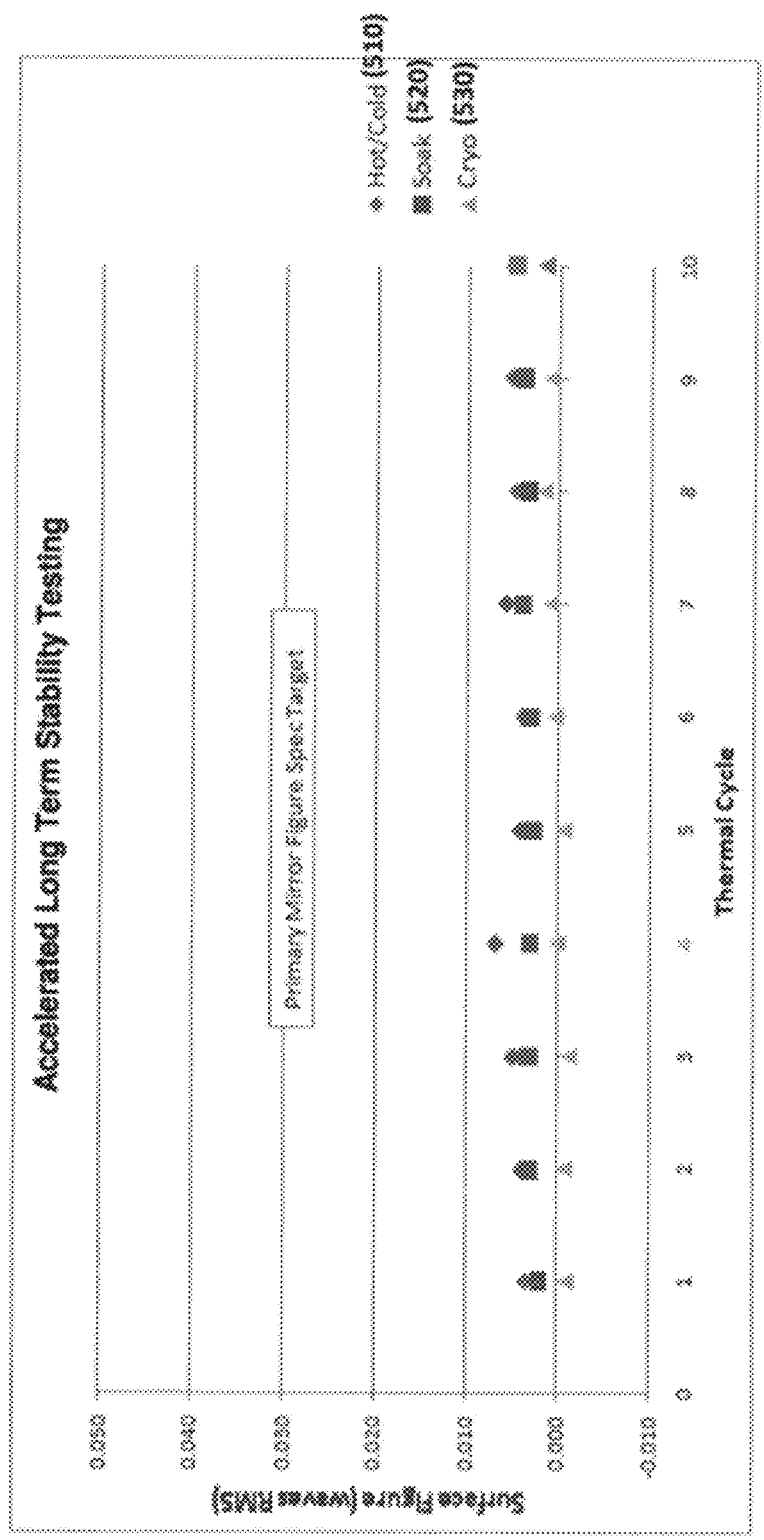
FIG. 5 is a graph illustrating test results for example magnesium mirrors according to aspects of the invention to demonstrate optical stability of the mirrors over time.

As discussed above, long-term optical stability is an important criterion for precision optical mirrors. Accordingly, accelerated long term stability testing was performed on the example magnesium mirrors to determine their optical stability. 15 thixotropically molded magnesium AZ91-D mirrors were diamond point turned and divided into three groups. Twelve of these mirrors (four from each of the three groups) were then conditioned using three different conditioning cycles/processes, one applied to each group of mirrors. The twelve mirrors were thermal cycled from 225° F. to −30° F. and re-tested interferometrically after each of the ten cycles. Referring to FIG. 5, which illustrates a graph of the test results for the mirrors, the conditioning cycles included a hot/cold test (data points 510), a soak test (data points 520), and a cryogenic test (data points 530). Each test was performed over the ten temperature cycles, as specified in MIL-STD-810, revision "G" promulgated by the Institute of Environmental Sciences and Technology (IEST).

The target specification for the mirror is given in terms of RMS surface figure (deviation between an actual optic and its ideal surface) with a target maximum being 0.030, corresponding to an RMS wavefront error of approximately $\lambda/33$. As illustrated in FIG. 5, the data demonstrates that magnesium AZ91-D mirrors may be optically stable over time.

Example 2

This example demonstrates the disclosed approaches of applying SPDT to a thixotropically molded magnesium substrate made of magnesium AZ91-D.

Figure 6A:
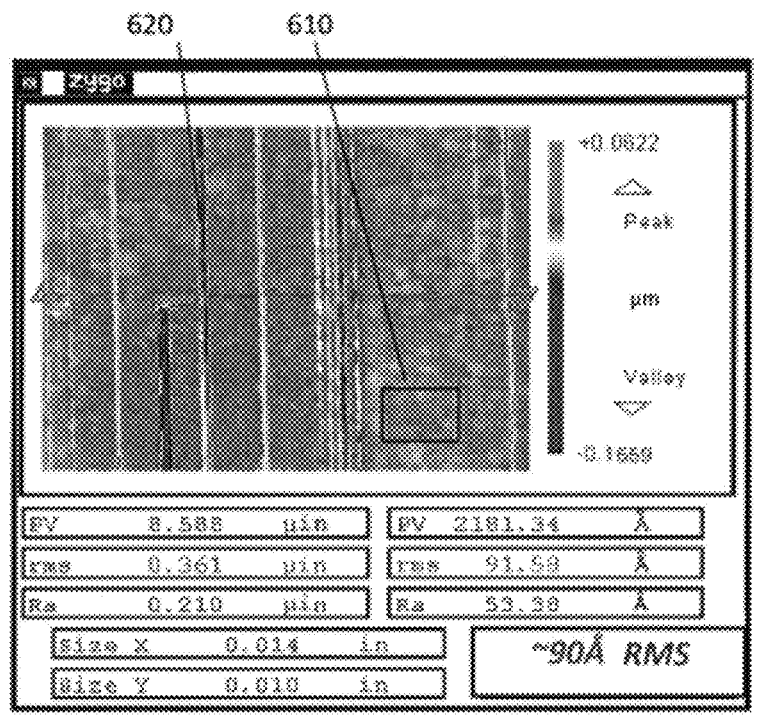
FIG. 6A is an image of a portion of an example thixotropically molded magnesium AZ91-D mirror to demonstrate the grain structure and achievable surface finish according to aspects of the invention.
Figure 6B:
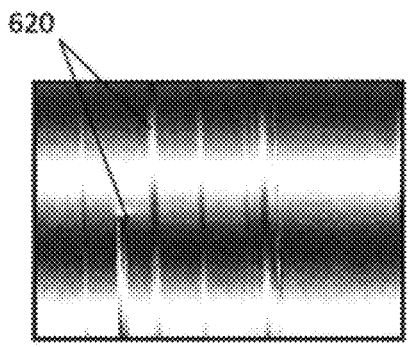
FIG. 6B is a fringe intensity image corresponding to FIG. 6A.

Referring to FIGS. 6A and 6B there are illustrated images of a microscopic view of the surface of an example mirror after SPDT. FIG. 6A illustrates a magnified image (approximately 20× magnification) of a portion of the reflective surface of the mirror. The surface finish was measured to be approximately 90 Å RMS. A surface finish of approximately 80-90 Å RMS is typical for aluminum 6061-T6 substrates. Thus, this example demonstrates that a surface finish quality at least equal to that of the aluminum 6061-T6 alloy is achievable with the thixotropically molded magnesium AZ91-D alloy. The turning marks 620 present in FIGS. 6A and 6B are SPDT process-related, and were created because this example mirror was cut with "air only," no coolant, and thus small "friction induced" tooling sleeks are present due to the lack of coolant lubrication.

Figure 6C:
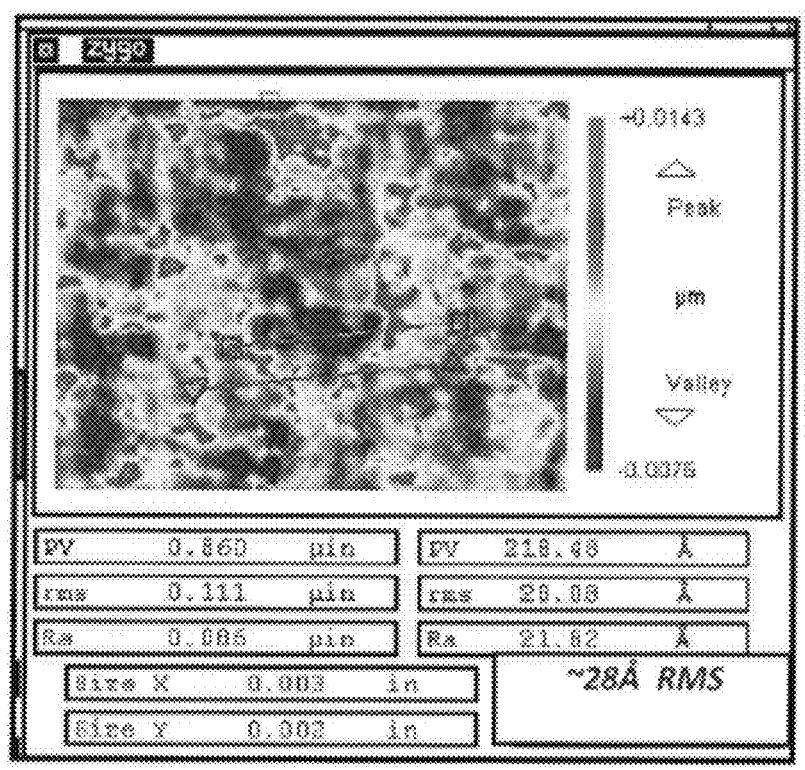
FIG. 6C is an enlarged image of the portion 310 identified in FIG. 6A showing grain structure.
Figure 6D:
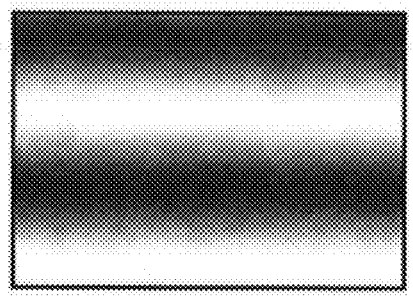
FIG. 6D is a fringe intensity image corresponding to FIG. 6C.

FIG. 6C is a further magnified image (approximately 100× magnification) of the portion of FIG. 6A within boundary 610. FIG. 6D is a corresponding image illustrating the peak and valleys in the surface finish. As can be seen with reference to FIG. 6C, there is a small amount of grain structure; however, this example demonstrates that surface finishes approaching 30 Å RMS are achievable with the magnesium AZ91-D alloy.

Example 3

This example further demonstrates the disclosed approaches of applying SPDT to a thixotropically molded magnesium substrate made of magnesium AZ91-D. In this example, a coolant (odorless mineral spirits) was used to provide lubrication and eliminate the "sleeking" (e.g., turning marks 620) present in Example 2. In addition, the mirror substrate used in this example was formed with engineered structural features on the back surface, as discussed above.

Figure 7A:
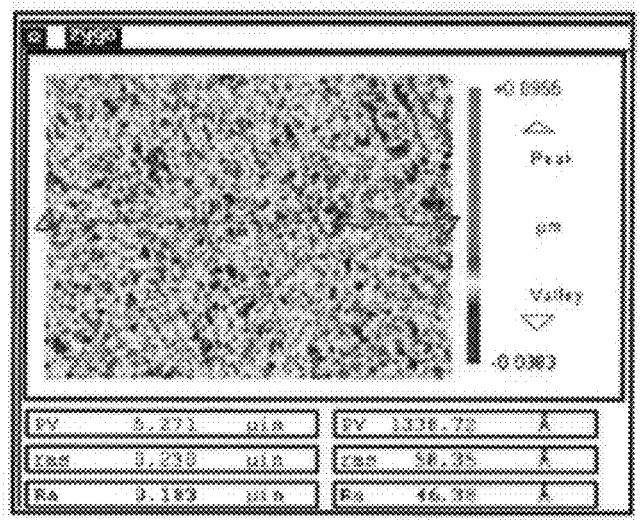
FIG. 7A is an image of a portion of an example thixotropically molded magnesium AZ91-D mirror to demonstrate surface finish of the reflective surface according to aspects of the invention.
Figure 7B:
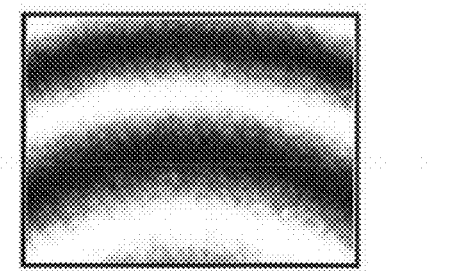
FIG. 7B is a fringe intensity image corresponding to FIG. 7A.

Referring to FIGS. 7A and 7B there are illustrated images of a portion of the reflective surface of the example thixotropically molded magnesium mirror substrate. In this example, a surface finish of approximately 58 Å RMS was achieved. This level of surface finish quality is 20 to 30% better than typically achieved for aluminum 6061-T6 substrates and may provide sufficiently low scatter for many applications, reducing or removing the need to perform additional finishing processes.

Example 4

As discussed above, selected ones of the diamond turned mirror substrates were finished using the processed discussed herein. This example demonstrates the compatibility of a mirror substrate made of thixotropically molded magnesium AZ91-D with an embodiment of the finishing process described in U.S. Pat. No. 6,921,177. The finish layer applied over the diamond turned surface was made of silicon and was approximately 12,000 Å thick. The finish layer was polished, as discussed above, to form the mirror surface.

Figure 8A:
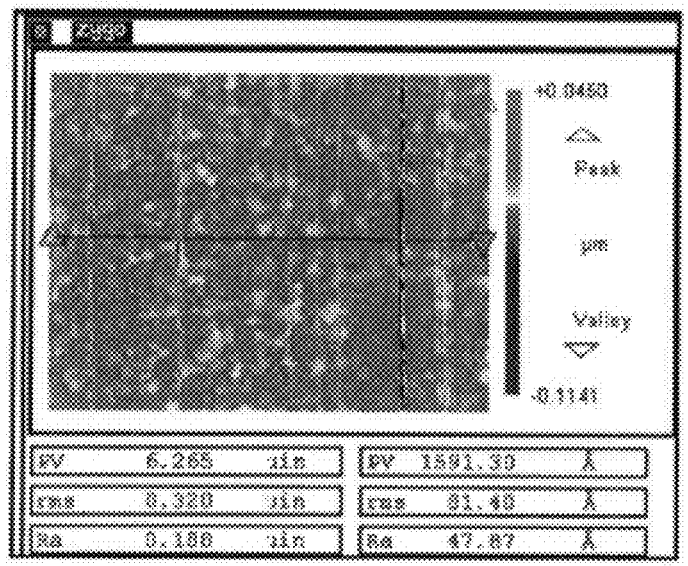
FIG. 8A is an image illustrating the surface finish of the diamond point turned surface of an example magnesium mirror according to aspects of the invention.
Figure 8B:
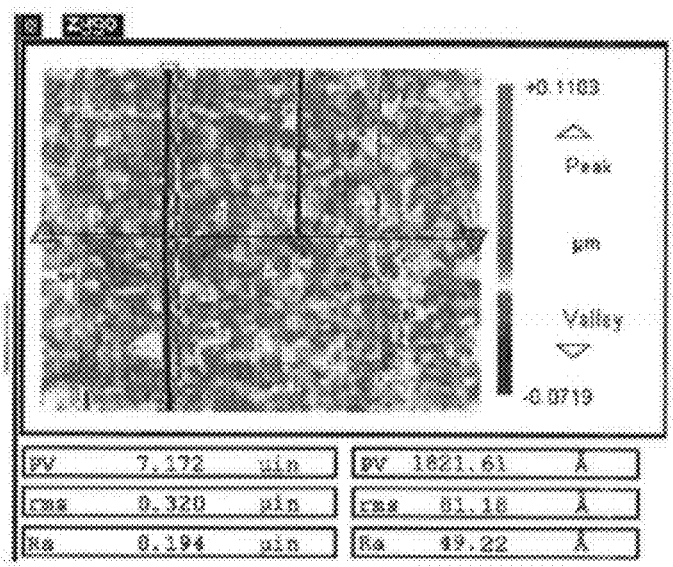
FIG. 8B is an image illustrating the surface finish of the example mirror of FIG. 8A after application of a finish layer according to aspects of the invention.
Figure 8C:
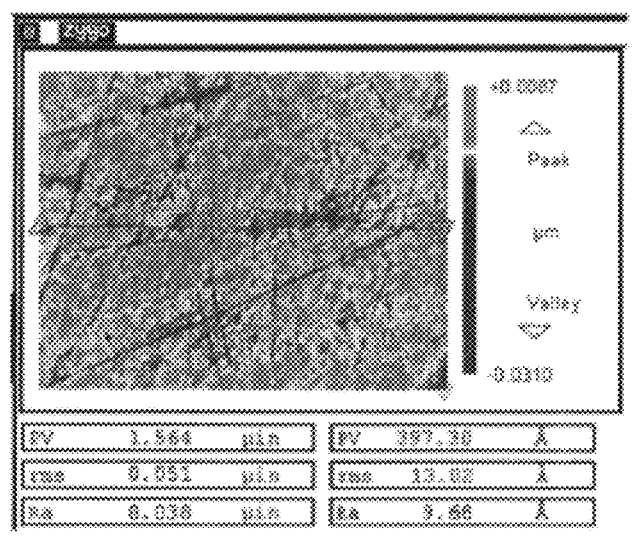
FIG. 8C is an image illustrates the surface finish of a polished surface of the mirror of FIGS. 8A and 8B according to aspects of the invention.

FIGS. 8A-8C illustrate images of a portion of the example mirror formed as discussed above. Experimental data demonstrates the compatibility of the thixotropically molded magnesium AZ91-D substrate with the finishing process discussed above.

FIG. 8A illustrates the surface finish of the diamond point turned surface 430 of the example mirror prior to the finishing steps 160-180. The surface has a surface finish of approximately 80 Å RMS.

FIG. 8B illustrates the surface finish of the surface 450 of the example mirror after application of the finish layer and prior to the polishing step 170. The surface still has a surface finish of approximately 80 Å RMS, and no adverse material or process interactions are present.

FIG. 8C illustrates the surface finish after the polishing step 180. The surface of the mirror now has a surface finish of approximately 13 Å RMS, demonstrating that magnesium substrate is compatible with the surface finishing techniques discussed in U.S. Pat. No. 6,921,177 to achieve exceptional surface finish quality.

Example 5

The disclosed approaches have been further demonstrated by applying magnetorheological finishing to the example magnesium mirror substrates after application of the thin-film finishing process discussed above. In this example, after SPDT, a finish layer of silicon, approximately 12,000 Å thick, was applied, as discussed above in Example 4. The finish layer was pre-polished using a sub-micron diamond slurry, and then magnetorheological finishing was applied to the polished surface to improve the surface figure and finish. Experimental data, as illustrated in FIGS. 9A-9C and 10A-10d demonstrated the compatibility of the magnesium substrate with the MRF process.

Figure 9A:
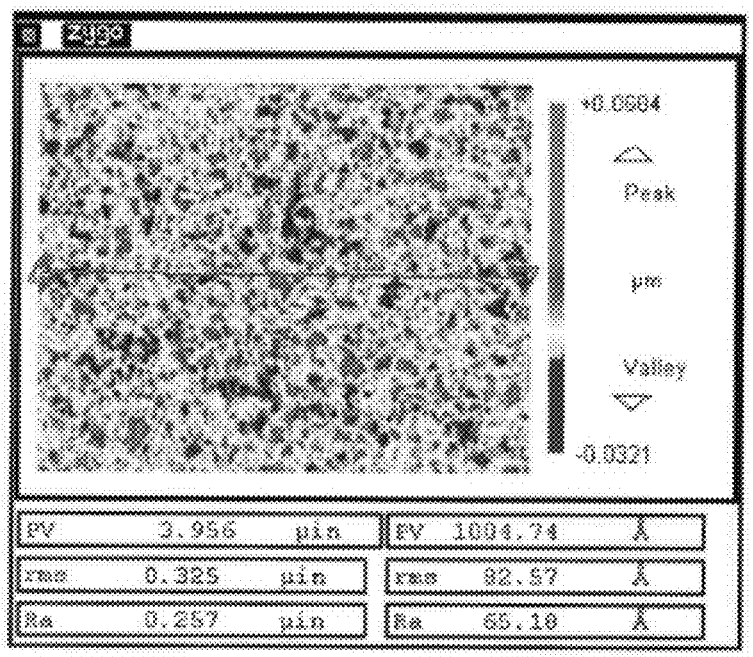
FIG. 9A is an image of a portion of an example of a magnesium substrate illustrating the surface finish after SPDT according to aspects of the invention.
Figure 9B:
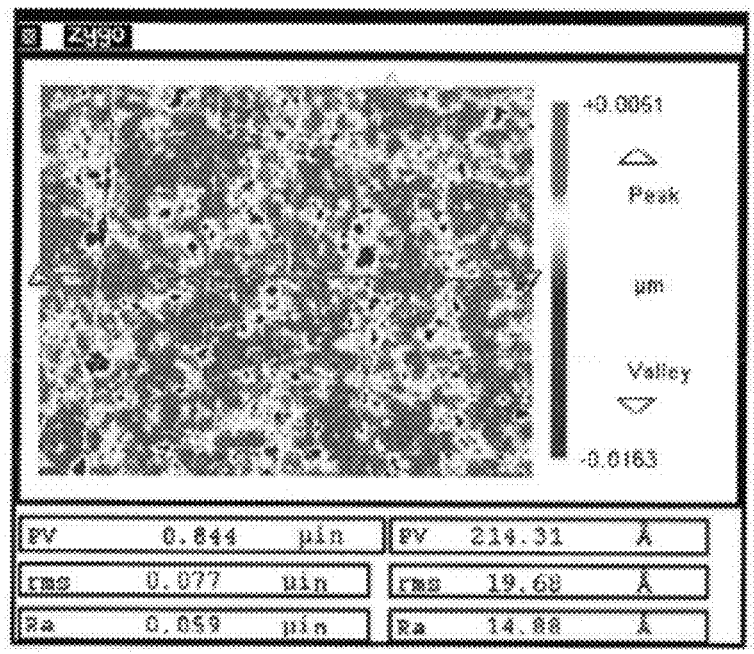
FIG. 9B is an image of the surface of the example substrate of FIG. 9A after application of a thin-film finishing process according to aspects of the invention.
Figure 9C:
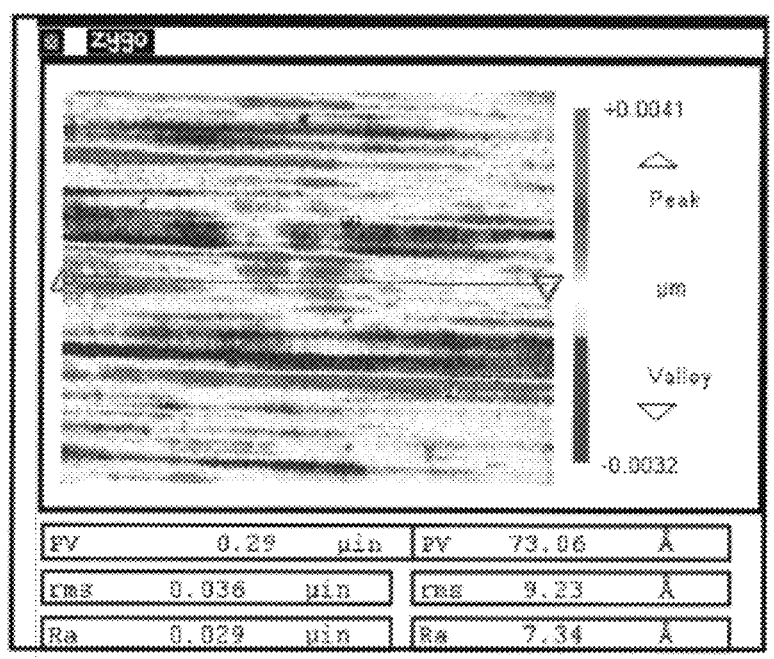
FIG. 9C is an image of the surface of the example substrate of FIGS. 9A and 9B after magnetorheological finishing according to aspects of the invention.

FIG. 9A illustrates the surface finish of the diamond point turned surface of the example mirror. The surface has a surface finish of approximately 80 Å RMS, similar to the examples discussed above. FIG. 9B illustrates the surface finish of the example mirror after the thin-film deposition and pre-polishing steps 160 and 170 discussed above. The surface has a surface finish of approximately 20 Å RMS. FIG. 9C illustrates the surface finish after the MRF process is also applied to the surface. The MRF process improves the surface finish of the mirror to approximately 10 Å RMS. Thus, MRF and/or thin-film finishing processes may be applied to the magnesium mirror substrates to improve the surface finish to below 20 Å RMS and a surface figure of less than $\lambda/20$.

FIGS. 10A-10D illustrate further experimental data for two of the example mirrors.

Figure 10A:
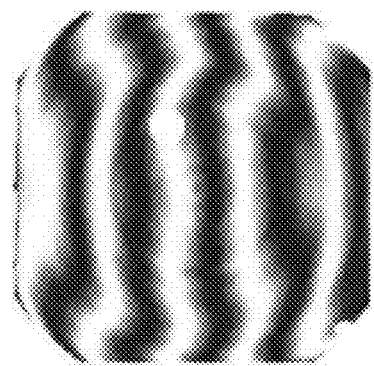
FIG. 10A is a fringe intensity image of the surface of one example of a magnesium substrate after SPDT according to aspects of the invention.
Figure 10B:
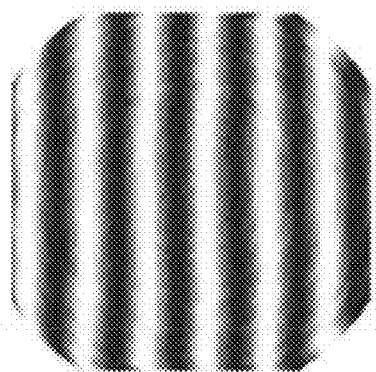
FIG. 10B is a corresponding fringe intensity image of example substrate of FIG. 10A after magnetorheological finishing according to aspects of the invention.

FIG. 10A is an image of the surface of the first example magnesium substrate after the SPDT process and after application of the thin-film finish layer discussed above. FIG. 10B is a corresponding image of the surface of the same example magnesium substrate after the application of MRF. In this example, the MRF process improved the surface figure to approximately $\lambda/100$.

Figure 10C:
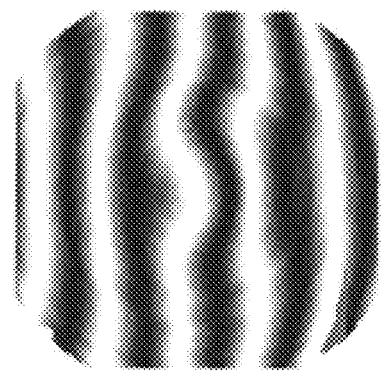
FIG. 10C is a fringe intensity image of the surface of another example of a magnesium substrate after SPDT according to aspects of the invention.
Figure 10D:
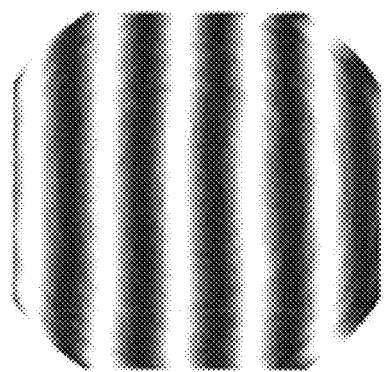
FIG. 10D is a corresponding fringe intensity image of the surface of the example substrate of FIG. 10C after magnetorheological finishing according to aspects of the invention.

FIG. 10C is an image of the surface of another example magnesium substrate after the SPDT process and after application of the thin-film finish layer discussed above. FIG. 10D is a corresponding image of the surface of the same example magnesium substrate after the application of MRF. In this example, the MRF process improved the surface figure to approximately $\lambda/80$.

These examples demonstrate that magnesium substrates can be processed using SPDT to achieve optical quality mirror surfaces. Surface finishing processes, including MRF, can be applied to improve the surface finish and/or surface figure to beyond what is presently achievable with SPDT. The magnesium substrates have been demonstrated to be optically stable over time, and can be cost-effectively designed to optimize weight, making them suitable for precision person-portable optical devices.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:
1. A method of manufacture of a reflective mirror comprising:
   thixotropically molding a magnesium alloy to produce a magnesium substrate having a first surface;
   single point diamond turning the first surface of the magnesium substrate to produce a reflective surface of the reflective mirror, the reflective surface having a surface finish of approximately 58-90 Angstroms RMS; and
   thermally conditioning the reflective mirror by temperature cycling the reflective mirror between two predetermined temperatures.

2. The method of claim 1, wherein thixotropically molding the magnesium alloy includes forming at least one of weight-reducing features and stress-relieving features on a second surface of the substrate, the second surface being on a side of the substrate opposite the first surface.

3. The method of claim 1, wherein thixotropically molding the magnesium alloy includes thixotropically molding magnesium AZ91-D.

4. The method of claim 1, further comprising finishing the reflective surface of the mirror using a computer controlled polishing process.

5. The method of claim 4, wherein finishing the reflective surface of the mirror includes magnetorheologically finishing the reflective surface of the mirror.

6. The method of claim 1, wherein single point diamond turning the first surface of the magnesium substrate includes using a free-form single point diamond turning process.

7. A method of manufacture of a reflective mirror comprising:
    thixotropically molding a magnesium alloy to form a magnesium substrate, the magnesium substrate having a first surface;
    single point diamond turning the first surface to produce the reflective mirror;
    depositing a thin-film finish layer on the first surface of the substrate;
    polishing the thin-film finish layer to provide a polished surface; and
    depositing a thin reflective layer on the polished surface to produce a reflective surface of the mirror.

8. The method of claim 7, wherein the magnesium alloy is magnesium AZ91-D.

9. The method of claim 7, further comprising plating the first surface prior to single point diamond turning the first surface.

10. The method of claim 7, further comprising finishing the first surface using a computer controlled polishing process.

11. The method of claim 10, wherein finishing the first surface includes magnetorheologically finishing the first surface.

* * * * *